Sept. 11, 1956  W. A. MASON, JR  2,762,283
FRONT MOUNTED CARRY-ALL

Filed Dec. 2, 1953  2 Sheets-Sheet 1

INVENTOR
WYLIE A. MASON, JR.

Paul O. Pippel
ATTORNEY

Sept. 11, 1956   W. A. MASON, JR   2,762,283
FRONT MOUNTED CARRY-ALL
Filed Dec. 2, 1953   2 Sheets-Sheet 2

INVENTOR
WYLIE A. MASON, JR.

Paul O. Pippel
ATTORNEY

United States Patent Office 2,762,283
Patented Sept. 11, 1956

2,762,283

FRONT MOUNTED CARRY-ALL

Wylie Alfred Mason, Jr., Memphis, Tenn., assignor to International Harvester Company, a corporation of New Jersey Application December 2, 1953, Serial No. 395,814

1 Claim. (Cl. 97—47.14)

This invention relates to implement attachments for tractors and the like, and particularly to implement attaching means for the front end of a tractor for mounting implements thereon. More specifically the invention concerns attaching mechanism for mounting implements upon a tractor in which complementary connecting elements are provided on the tractor and the tool-carrying frame of the implement whereby the implement can be made integral with the tractor merely by driving the tractor to the implement, the parts being automatically locked together.

The invention is particularly concerned with implement attaching mechanism of the two-point type including elongated sockets carried by the tractor to receive shaft members carried by the implement, wherein latching means are provided operable upon insertion of the shafts in the sockets to lock the parts against relative displacement. An object of the invention is, therefore, the provision of improved attaching mechanism for the front end of tractors wherein means are provided for facilitating the attachment of the implement to the tractor to form an integral association therebetween.

Another object of the invention is the provision of an improved implement attaching mechanism for a tractor particularly adapted for the connection thereto of cultivators and the like, wherein means are incorporated in the attaching mechanism for leveling the tool-carrying frame and to adjust the working depth thereof.

Another object of the invention is the provision of implement attaching mechanism for a tractor having hydraulically operated power transmission mechanism thereon connectable to the implement attaching structure for independently vertically moving the earth-working tools between operating and transport positions on the tractor, and for leveling as well as adjusting the working depth of the tools.

Other objects and advantages of the invention will become clear from the following detailed description when read in conjunction with the accompanying drawings, wherein.

Figure 1:
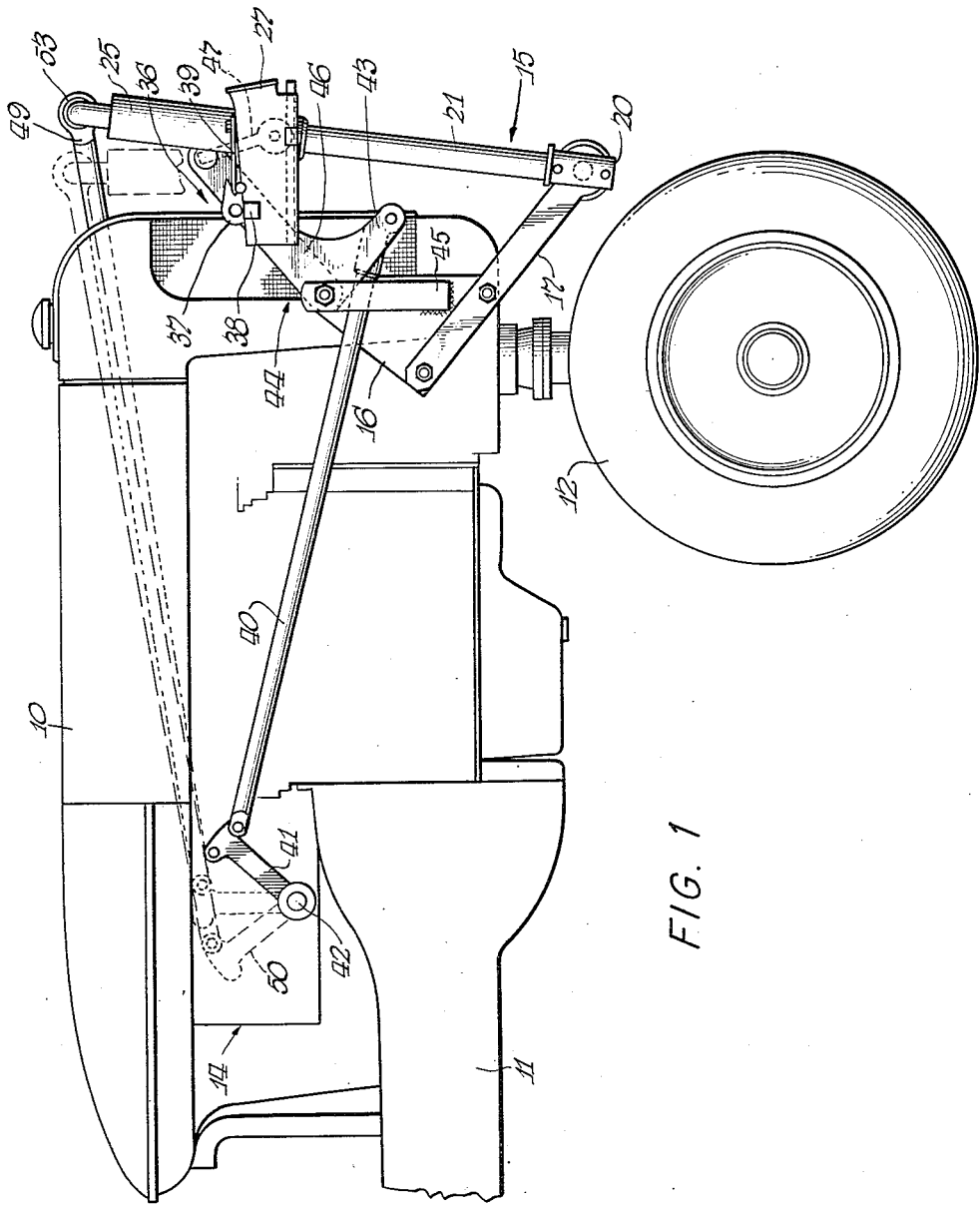
Figure 1 is a view in side elevation of the front end of a tractor having an implement attaching structure integral with the tractor incorporating the features of this invention.
Figure 2:
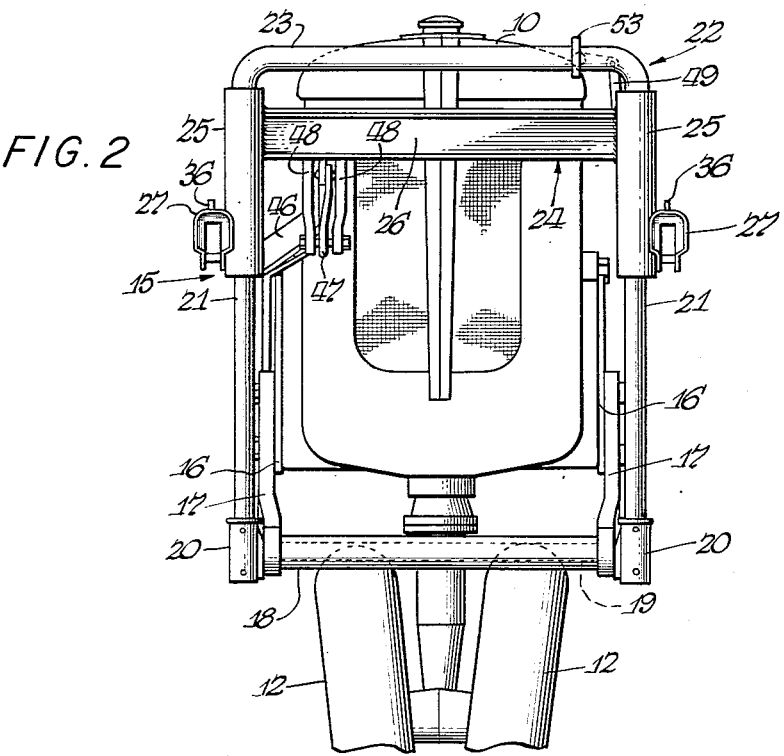
Figure 2 is a front elevation of the tractor and implement attaching structure shown in Figure 1.

Referring to the drawings, the numeral 10 designates the body of a tricycle type tractor having a power plant 11, front wheels 12 and a pair of laterally spaced rear drive wheels 13, only one of which is shown. The tractor is provided with a power lift unit generally designated at 14 which is preferably hydraulically operated by fluid under pressure powered from the tractor power plant.

Integral with the tractor is an implement hitch mechanism generally designated by the numeral 15, of the two-point type, which comprises a bracket 16, one of which is affixed to the tractor body at each side thereof, and which includes a pair of forwardly and downwardly extending straps 17 affixed to opposite ends of a tube 18 extending transversely across the front end of the tractor and rotatably supporting a shaft 19, to the opposite ends of which are secured housings 20 for fixedly receiving the lower ends of the laterally spaced vertically extending arms 21 of a U-shaped rockable frame member 22 provided with an upper rigid transverse portion 23. The rockable member 22 is thus rockable about the axis of the shaft 19 for a purpose which will hereinafter become clear.

Figure 3:
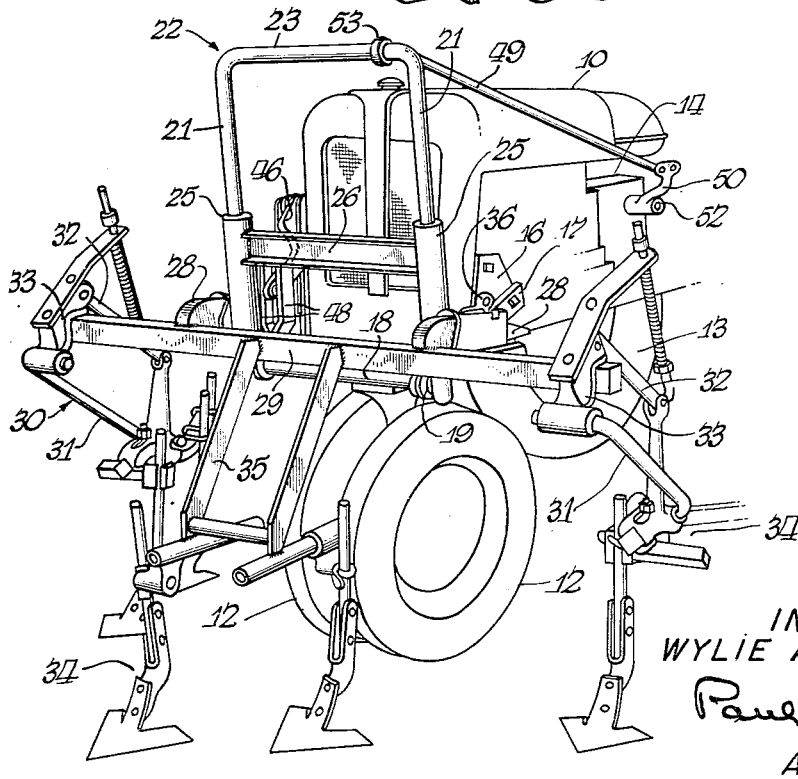
Figure 3 is a perspective view of the front end of a tractor showing a cultivator incorporated in an implement attachment for the tractor.

Mounted upon the rockable member 22 for vertical sliding movement thereon is a supporting frame member 24 which comprises a pair of laterally spaced vertical sleeve members 25, mounted for sliding movement upon the respective arms 21 and rigidly connected by a transverse brace member 26 extending across the front end of the tractor parallel to the part 23 of the rockable member 22 and the rockshaft 19. Each of the sleeves 25 has affixed thereto, as by welding, laterally spaced longitudinally extending socket members 27, for a full description of which reference may be had to copending application Serial No. 338,651, dated February 25, 1953. The socket members 27 are flared at their forward ends for the easy reception of longitudinally extending shaft members 28, affixed to and extending rearwardly from the transversely extending tool bar 29 of a tool-carrying frame generally designated at 30 in Figure 3. The tool-carrying frame 30 is of a more or less conventional construction and carries laterally spaced pairs of parallel links 31 and 32 pivotally mounted upon brackets 33 upon the tool bar 29 for vertical movement with respect thereto. Each of the parallel link units carries an earth-working gang of cultivator shovels 34, and a sub-frame 35 affixed to the tool bar 29 medially of its ends, which extends forwardly ahead of the front wheels 12 for the mounting thereon of another gang of shovels.

The sockets 27 and the shafts 28 are elongated, and the reception of the shafts in the sockets provides a stable connection of the tool-carrying frame to the implement attaching structure on the tractor so that the entire unit including the supporting frame 24 may be vertically moved on the rockable member 22 between operating and transport positions. Latch mechanism 36 carried by each of the sockets 27 includes a rockable member 37 having a detent portion 38 receivable in suitable notches, not shown, provided in the shafts 28, and held in engagement therein by means of a leaf spring 39 affixed at one end to the socket 27 and operatively engaging the member 37 at its other end. Upon insertion of the shafts in the sockets the detent 38 is raised against the action of the spring 39 and is automatically received in the notch provided. The latch is released by manually lifting the member 37.

Vertical movement of the supporting frame 24 and, therefore, of the tool-carrying frame 30 between operating and transport positions of the implement on the tractor is accomplished by power transmission mechanism including a connecting rod 40 on the right hand side of the tractor, connected at its rear end to an arm 41 on a rockshaft 42 mounted in the power lift housing 14 and rocked in any suitable manner, preferably by hydraulic rams, not shown, under the control of the tractor operator and operable to hold the rock arm 41 in any selected position of adjustment. The forward end of the rod 40 is pivotally connected to one arm 43 of a bell crank 44, pivotally mounted upon the bracket 16 between the bracket and an upright 45 affixed at its lower end thereto, and having another arm 46, bifurcated at its end for pivotal connection to the upper end of a link 47, the lower end of which is pivotally mounted between the lower ends of a pair of lugs 48, the upper ends of which are affixed as by welding to the transverse brace 26 and depend therefrom. It should thus be clear that by rocking the arm 41 power is transmitted through rod 40, bell crank 44 and link 47 to vertically move the supporting frame 24 and the tool-carrying frame carried thereby and that the movement of the hitch frame 15 from the solid line to the dotted line position of Fig. 1 is accommodated by the swinging of the link 47.

The pitch of the shovels of the cultivator gangs 34 and the leveling of the tool frame is accomplished by an independently operable power transmission mechanism comprising a rod 49 pivotally connected at its rear end to another rock arm 50 mounted upon a shaft 52 projecting from the side of the tractor body and operated by mechanism similar to that for the operation of arm 41. The rod 49 extends forwardly along the left hand side of the tractor and its forward end is provided with a bearing 53 to receive the transverse portion 23 of the member 22. The rock arm 50 is preferably under the independent control of the tractor operator so that the member 22 can be rocked longitudinally to selected positions about the axis of the shaft 19 to adjust the pitch of the earth-working tools and level the implement with respect to the ground.

From the foregoing it should be clear that a novel implement attachment and hitch structure for the front end of a tractor has been provided by the mechanism described herein. The invention has been described in a preferred embodiment thereof, and it should be understood that modifications may be made therein without departing from the spirit of the invention or the scope of the appended claim.

What is claimed is:

A tractor hitch of the two-point type for integrally connecting a tool-carrying frame to the tractor, wherein the tractor is provided with power lift means and with a pair of laterally spaced attaching elements vertically movable to positions in registry with complementary attaching elements on the tool frame, whereby the tractor may be driven to the tool frame to effect automatic cooperative engagement of said elements to form a unit with the tool frame, comprising a generally vertically extending rockable member including laterally spaced guide bars and mounted at its lower end on the tractor in advance of the front end thereof for longitudinal rocking movement about a horizontal transverse axis, means on the tractor connected to said rockable member for rocking the latter, a supporting member including laterally spaced rigidly interconnected vertical sleeve members slidably receiving said bars, laterally spaced elongated socket members affixed to the respective sleeve members for cooperation with complementary elongated shaft members mounted on the tool frame, independently operable power transmission means operatively connecting said power lift means to said supporting member for vertically moving the latter to positions with said socket members in registry with said shaft members and to vertically move the tool frame between operating and transport positions upon reception of the shafts in the sockets, including link means accommodating said vertical movement of the supporting member in any position of adjustment of the rockable member, and means for automatically and releasably locking the shafts in the respective sockets.

References Cited in the file of this patent
UNITED STATES PATENTS

| | | |
|---|---|---|
| 772,418 | Knight | Oct. 18, 1904 |
| 1,419,014 | Burtnett | June 6, 1922 |
| 1,450,417 | Gingerick | Apr. 3, 1923 |
| 1,464,740 | Benjamin et al. | Aug. 14, 1923 |
| 2,404,518 | Moran | July 23, 1946 |
| 2,421,472 | Way | June 3, 1947 |
| 2,450,905 | Mork | Oct. 12, 1948 |
| 2,514,563 | Todd | July 11, 1950 |
| 2,562,817 | Pethick | July 31, 1951 |
| 2,659,288 | Vanderloop | Nov. 17, 1953 |